US006879884B2

(12) United States Patent
Miyashita et al.

(10) Patent No.: US 6,879,884 B2
(45) Date of Patent: Apr. 12, 2005

(54) ENERGY EVALUATION SUPPORT SYSTEM, PROGRAM, INFORMATION STORAGE MEDIUM, AND ENERGY EVALUATION SUPPORT METHOD

(75) Inventors: Takeshi Miyashita, Suwa (JP); Yoshitake Kobayashi, Shiojiri (JP); Junichi Takeuchi, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/797,590

(22) Filed: Mar. 10, 2004

(65) Prior Publication Data

US 2004/0225413 A1 Nov. 11, 2004

(30) Foreign Application Priority Data

Mar. 12, 2003 (JP) .................................. 2003-066966

(51) Int. Cl.[7] .............................................. G06F 19/00
(52) U.S. Cl. ......................................................... 700/291
(58) Field of Search ............................. 700/95–97, 99, 700/286, 291, 295, 297; 705/7–10, 412; 703/6–12, 18; 706/906, 907, 914, 915, 919, 920

(56) References Cited

U.S. PATENT DOCUMENTS

| 5,467,265 | A | * | 11/1995 | Yamada et al. ................ 700/49 |
| 5,557,556 | A | * | 9/1996 | Shank, Jr. ...................... 703/18 |
| 5,666,297 | A | * | 9/1997 | Britt et al. ...................... 703/18 |
| 5,798,939 | A | * | 8/1998 | Ochoa et al. ................. 700/286 |
| 5,930,779 | A | * | 7/1999 | Knoblock et al. ........... 705/412 |
| 5,978,771 | A | * | 11/1999 | Vandivier, III .................. 705/8 |
| 6,220,743 | B1 | * | 4/2001 | Campestre et al. ............ 700/97 |
| 6,366,889 | B1 | * | 4/2002 | Zaloom ........................... 705/7 |
| 6,691,065 | B2 | * | 2/2004 | Hayashi et al. .............. 702/184 |
| 6,701,298 | B1 | * | 3/2004 | Jutsen ............................. 705/7 |
| 6,785,592 | B1 | * | 8/2004 | Smith et al. ................. 700/291 |
| 6,819,097 | B2 | * | 11/2004 | Chen ........................... 324/142 |
| 6,820,045 | B1 | * | 11/2004 | Asano et al. ................... 703/6 |

FOREIGN PATENT DOCUMENTS

JP       2002-145421       5/2002

OTHER PUBLICATIONS

Patent Abstracts of Japan regarding Publication No. 2002–145421 published May 22, 2002.

* cited by examiner

*Primary Examiner*—Maria N. Von Buhr
(74) *Attorney, Agent, or Firm*—Harness, Dickey & Pierce, P.L.C.

(57) ABSTRACT

To provide an energy evaluation support system and the like which can more efficiently and precisely compute electric power consumption for each of predetermined processing units such as production steps and the like, the energy evaluation support system includes a receiving section which receives a factory design request including a production condition instruction indicating a production condition from the user, a storage section which stores a production device database containing data relating to production devices and a requisite-power supply device database containing data relating to requisite-power supply devices, a processing section which computes energy consumption for each of the production devices and the requisite-power supply devices and for each requisite power type, based on the production device database and requisite-power supply device database according to the factory design request from the user, and an output section which presents the energy consumption computed by the processing section to the user in a predetermined form.

9 Claims, 14 Drawing Sheets

FIG. 3

DATA INPUT (PRODUCTION DEVICE)

[CREATE] [COPY] [DELETE] [PREVIOUS] [NEXT] [SEARCH] [DEVICE ID] [PRINT] [DATA INPUT] [DATA OUTPUT] [COST] [ENERGY] [MAIN]

<u>BASIC DATA</u>

DEVICE CLASIFICATION/NAME/MAKER

| ION | / | E |

OPERATING RATE: 1.00
FAILURE RATE:

<u>REQUISITE-POWER USED    STANDBY</u>

| | MAIN BODY SYSTEM | ACCESSORIAL DEVICE A | ACCESSORIAL DEVICE B |
|---|---|---|---|
| ELECTRIC POWER [kw] | 10.0 | 0.5 | |
| COOLING WATER [l/min] | 40.0 | | |
| ... | | | ... |

<u>INITIAL DATA</u>

| PRICE [¥] | ¥200,000,000 |
| TOTAL PRICE OF ACCESSORIES [¥] | ¥200,000,000 |
| PRICE OF ACCESSORIAL DEVICE A [¥] | ¥50,000,000 |
| PRICE OF ACCESSORIAL DEVICE B [¥] | |

<u>CONSUMPTION ARTICLES/MAINTENANCE COST</u>

MAIN BODY SYSTEM ITEM  | FREQUENCY [CYCLE OF MONTH] | MAINTENANCE COST [¥/TIME]

| TIME INSTRUCTION 1 | | | |
| TIME INSTRUCTION 2 | | | |
| ... | ... | ... | ... |

<u>QUALITY INSPECTION COST</u>

ITEM | FREQUENCY [CYCLE OF MONTH] | RECIPE USED

| TIME INSTRUCTION 1 | | | |
| TIME INSTRUCTION 2 | | | |
| ... | ... | ... | ... |

<u>ACCESSORIAL DEVICE DATA</u>

| | NAME | VERSION | NUMBER OF UPPER CONNECTIONS |
|---|---|---|---|
| ACCESSORIAL DEVICE A | G1 | 1 | 3 |
| ACCESSORIAL DEVICE B | | | |

FIG. 4

DATA INPUT (PRODUCTION PROCESS)

[CREATE] [COPY] [DELETE] [PREVIOUS] [NEXT] [SEARCH] [DEVICE ID] [PRINT] [DATA INPUT] [DATA OUTPUT] [COST] [ENERGY] [MAIN]

BASIC DATA

BLOCK NAME: [BLOCK A]
DEVICE ID/DEVICE NUMBER (VERSION): [0009] / [201] (1.1)
RECIPE NAME (VERSION): [301] (2)

THROUGHPUT DATA

Raw Process Time [min]: [ ]
Batch Size [lot/bat]: [ ]
Process Interval Time [min]: [ ]

REQUISITE-POWER USED PROCESSING

| | MAIN BODY SYSTEM | ACCESSORIAL DEVICE A | ACCESSORIAL DEVICE B | ... |
|---|---|---|---|---|
| ELECTRIC POWER [kw] | 5.0 | 0.5 | | |
| COOLING WATER [l/min] | 4.0 | | | |
| ... | | | | |

CONSUMPTION ARTICLES/MAINTENANCE COST

MAIN BODY SYSTEM

| ITEM | FREQUENCY [SHEET] | MAINTENANCE COST [¥/TIME] | ... |
|---|---|---|---|
| CHANGE OF CLOTH | 500 | ¥90,000 | ... |
| CHANGE OF BRUSH | 700 | ¥30,000 | ... |

NUMBER OF SHEET INSTRUCTION 1: [ ]
NUMBER OF SHEET INSTRUCTION 2: [ ]
...

QUALITY INSPECTION COST

| ITEM | FREQUENCY [SHEET] | RECIPE USED | ... |
|---|---|---|---|
| | | | ... |

NUMBER OF SHEET INSTRUCTION 1: [ ]
NUMBER OF SHEET INSTRUCTION 2: [ ]

AMOUNT OF MATERIAL USED PROCESSING

| | TYPE | AMOUNT OF USE [cc/SHEET] | ... |
|---|---|---|---|
| MATERIAL 1 | P1 | 350 | |
| MATERIAL 2 | P2 | 300 | |
| ... | | | |

FIG. 5

| DATA INPUT (PRODUCTION STEPS) | | | | | | | | | | |
|---|---|---|---|---|---|---|---|---|---|---|
| CREATE | COPY | DELETE | PREVIOUS | NEXT | SEARCH | DEVICE ID | PRINT | DATA INPUT | DATA OUTPUT | COST | ENERGY | MAIN |

| PRODUCT TYPE 1 | VERSION | PRODUCT TYPE 2 | VERSION | ORDER OF STEPS | STEP NAME 1 | STEP NAME 2 | USED DEVICE ID | USED RECIPE NAME | VERSION |
|---|---|---|---|---|---|---|---|---|---|
| M1 | (5) | T931 | (11) | 1 | P1 | WAFER WASHING | 0001 | R1 | (2) |
| M1 | (11) | T931 | (18) | 2 | P1 | LIGHT ETCHING | 0002 | R2 | (1) |
| ... | ... | ... | ... | ... | ... | ... | ... | ... | ... |

ENERGY EVALUATION SUPPORT SYSTEM, PROGRAM, INFORMATION STORAGE MEDIUM, AND ENERGY EVALUATION SUPPORT METHOD

Japanese Patent Application No. 2003-66966, filed on Mar. 12, 2003, is hereby incorporated by reference in its entirety.

BACKGROUND OF THE INVENTION

The present invention relates to an energy evaluation support system, program, information storage medium and energy evaluation support method which can evaluate the energy consumption in a factory using a plurality of devices.

In general, the energy consumption in an entire building can be detected, for example, through a wattmeter or a water meter.

When a factory is newly designed, for example, however, it is required to provide new production and requisite-power supply devices, all of which are suitable for use in the newly designed factory. For such a reason, the prior art required a huge amount of time to design a new factory since designers used a technique of broadly predicting its energy consumption based on measurements such as past electric power consumption and the like or another technique of simulating and computing the energy consumption in the newly designed factory.

For example, Japanese Patent Application Laid-Open No. 2002-145421 discloses a supply chain simulation system.

However, it is difficult to apply such a general simulation as described in Japanese Patent Application Laid-Open No. 2002-145421 to a simulation for the production devices.

This is because the production devices are actuated by various kinds of requisite powers such as purified water and exhaust gas, in addition to the electric power. In other words, if a general household appliance product operated only by the electric power is to be designed, it is relatively easy and simple to compute and simulate its electric power consumption. However, the design of production device requires a more complicated process since it is necessary to simulate a plurality of different requisite powers.

BRIEF SUMMARY OF THE INVENTION

The present invention is made in view of such a problem, and may provide an energy evaluation support system, program, information storage medium and energy evaluation support method which can more efficiently and precisely compute energy consumption for each of predetermined count units such as production steps or the like.

According to one aspect of the present invention, there is provided an energy evaluation support system for presenting an amount of energy consumed in a factory with a plurality of devices to a user, the devices including a plurality of production devices and a plurality of requisite-power supply devices which supplies a plurality of types of requisite power to the plurality of the production devices, the system comprising:

receiving means for receiving a design request of a factory including a production condition instruction indicating a production condition decided by the user;

storage means for storing a production device database containing data relating to the plurality of the production devices and a requisite-power supply device database containing data relating to the plurality of the requisite-power supply devices;

processing means for computing an amount of first energy consumption for each of the plurality of the production devices and the plurality of the requisite-power supply devices and for each type of the requisite power, based on the production device database and the requisite-power supply device database according to the design request; and output means for presenting the amount of the first energy consumption computed by the processing means to the user in a predetermined form, wherein the processing means:

selects production devices to be used among the plurality of the production devices according to the production condition instruction, and computes an amount of the requisite power required by the production devices to be used for each type of the requisite power;

selects requisite-power supply devices to be used among the plurality of the requisite-power supply devices, based on the amount of the requisite power for each type of the requisite power, and computes an amount of second energy consumption required by the requisite-power supply devices to be used for each type of the requisite power; and computes a coefficient of energy consumption indicating an amount of third energy consumption per predetermined unit of the requisite power supplied by the requisite-power supply devices to be used, based on the amount of the second energy consumption for each type of the requisite power, and computes the amount of the first energy consumption based on the coefficient of energy consumption.

According to another aspect of the present invention, there is provided an energy evaluation support system for presenting an amount of energy consumed in a factory with a plurality of devices to a user, the devices including a plurality of production devices and a plurality of requisite-power supply devices which supplies a plurality of types of requisite power to the plurality of the production devices, the system comprising:

a receiving section which receives a design request of a factory including a production condition instruction indicating a production condition decided by the user;

a storage section which stores a production device database containing data relating to the plurality of the production devices and a requisite-power supply device database containing data relating to the plurality of the requisite-power supply devices;

a processing section which computes an amount of first energy consumption for each of the plurality of the production devices and the plurality of the requisite-power supply devices and for each type of the requisite power, based on the production device database and the requisite-power supply device database according to the design request; and an output section which presents the amount of the first energy consumption computed by the processing section to the user in a predetermined form, wherein the processing section:

selects production devices to be used among the plurality of the production devices according to the production condition instruction, and computes an amount of the requisite power required by the production devices to be used for each type of the requisite power;

selects requisite-power supply devices to be used among the plurality of the requisite-power supply devices, based on the amount of the requisite power for each type of the requisite power, and computes an amount of second energy consumption required by the requisite-power supply devices to be used for each type of the requisite power; and computes a coefficient of energy consumption indicating an amount of third energy consumption per predetermined unit of the requisite power supplied by the requisite-power supply devices to be used, based on the amount of the second energy consumption for each type of the requisite power, and computes the amount of the first energy consumption based on the coefficient of energy consumption.

According to a further aspect of the present invention, there is provided a computer-readable program for causing a computer to function as an energy evaluation support system for presenting an amount of energy consumed in a factory with a plurality of devices to a user, the devices including a plurality of production devices and a plurality of requisite-power supply devices which supplies a plurality of types of requisite power to the plurality of the production devices, the program causing the computer to function as:

receiving means for receiving a design request of a factory including a production condition instruction indicating a production condition decided by the user;

storage means for storing a production device database containing data relating to the plurality of the production devices and a requisite-power supply device database containing data relating to the plurality of the requisite-power supply devices;

processing means for computing an amount of first energy consumption for each of the plurality of the production devices and the plurality of the requisite-power supply devices and for each type of the requisite power, based on the production device database and the requisite-power supply device database according to the design request; and output means for presenting the amount of the first energy consumption computed by the processing means to the user in a predetermined form, wherein the processing means:

selects production devices to be used among the plurality of the production devices according to the production condition instruction, and computes an amount of the requisite power required by the production devices to be used for each type of the requisite power;

selects requisite-power supply devices to be used among the plurality of the requisite-power supply devices, based on the amount of the requisite power for each type of the requisite power, and computes an amount of second energy consumption required by the requisite-power supply devices to be used for each type of the requisite power; and computes a coefficient of energy consumption indicating an amount of third energy consumption per predetermined unit of the requisite power supplied by the requisite-power supply devices to be used, based on the amount of the second energy consumption for each type of the requisite power, and computes the amount of the first energy consumption based on the coefficient of energy consumption.

According to still another aspect of the present invention, there is provided an information storage medium storing a computer-readable program for causing a computer to function as an energy evaluation support method for presenting an amount of energy consumed in a factory with a plurality of devices to a user, the devices including a plurality of production devices and a plurality of requisite-power supply devices which supplies a plurality of types of requisite power to the plurality of the production devices, the program causing the computer to function as:

receiving means for receiving a design request of a factory including a production condition instruction indicating a production condition decided by the user;

storage means for storing a production device database containing data relating to the plurality of the production devices and a requisite-power supply device database containing data relating to the plurality of the requisite-power supply devices;

processing means for computing an amount of first energy consumption for each of the plurality of the production devices and the plurality of the requisite-power supply devices and for each type of the requisite power, based on the production device database and the requisite-power supply device database according to the design request; and output means for presenting the amount of the first energy consumption computed by the processing means to the user in a predetermined form, wherein the processing means:

selects production devices to be used among the plurality of the production devices according to the production condition instruction, and computes an amount of the requisite power required by the production devices to be used for each type of the requisite power;

selects requisite-power supply devices to be used among the plurality of the requisite-power supply devices, based on the amount of the requisite power for each type of the requisite power, and computes an amount of second energy consumption required by the requisite-power supply devices to be used for each type of the requisite power; and computes a coefficient of energy consumption indicating an amount of third energy consumption per predetermined unit of the requisite power supplied by the requisite-power supply devices to be used, based on the amount of the second energy consumption for each type of the requisite power, and computes the amount of the first energy consumption based on the coefficient of energy consumption.

According to a still further aspect of the present invention, there is provided an energy evaluation support method for presenting an amount of energy consumed in a factory with a plurality of devices to a user, the devices including a plurality of production devices and a plurality of requisite-power supply devices which supplies a plurality of types of requisite power to the plurality of the production devices, the method comprising:

storing a production device database containing data relating to the plurality of the production devices and a requisite-power supply device database containing data relating to the plurality of the requisite-power supply devices;

receiving a design request including a production condition instruction indicating a production condition decided by the user;

selecting production devices to be used among the plurality of the production devices according to the production condition instruction, based on the production device database;

computing an amount of the requisite power required by the production devices to be used for each type of the requisite power;

selecting requisite-power supply devices to be used among the plurality of the requisite-power supply devices, based on the requisite-power supply device database and the amount of the requisite power for each type of the requisite power;

computing an amount of second energy consumption required by the requisite-power supply devices to be used for each type of the requisite power;

computing a coefficient of energy consumption indicating an amount of third energy consumption per predetermined unit of the requisite power supplied by the requisite-power supply devices to be used, based on the amount of the second energy consumption for each type of the requisite power;

computing an amount of first energy consumption based on the coefficient of energy consumption; and outputting the amount of the first energy consumption in a predetermined form.

In accordance with these aspects of the present invention, the energy evaluation support system and the like can efficiently and precisely compute an amount of energy consumption according to a change in requisite power supply associated with an increase and decrease in the number of the production devices by converting an amount of energy consumption of the requisite-power supply devices into the coefficient of energy consumption.

In the energy evaluation support system, program, and information storage medium, the processing means may determine whether or not any one of the production devices to be used and the requisite-power supply devices to be used has an amount of energy consumption per device equal to or greater than a predetermined reference value, and may select at least one of the plurality of the production devices and the plurality of the requisite-power supply devices having an amount of the energy consumption per device less than the predetermined reference value, in a case where any one of the production devices to be used and the requisite-power supply devices to be used has an amount of the energy consumption per device equal to or greater than the predetermined reference value.

In the energy evaluation support method, whether or not any one of the production devices to be used and the requisite-power supply devices to be used has an amount of energy consumption per device equal to or greater than a predetermined reference value may be determined, and at least one of the plurality of the production devices and the plurality of the requisite-power supply devices having an amount of the energy consumption per device less than the predetermined reference value may be selected, in a case where any one of the production devices to be used and the requisite-power supply devices to be used has an amount of the energy consumption per device equal to or greater than the predetermined reference value.

With this configuration, the energy evaluation support system and the like can present a factory and the like consisting of devices with less energy consumption to a user. Therefore, the user can plan to save energy at a design stage.

In the energy evaluation support system, program, and information storage medium, the design request may include an operation season instruction indicating an operation season of the factory, and the processing means may correct the amount of the first energy consumption according to the operation season instruction.

In the energy evaluation support method, the design request may include an operation season instruction indicating an operation season of the factory, and the amount of the first energy consumption may be corrected according to the operation season instruction.

With this configuration, the energy evaluation support system and the like can present more precise amount of energy consumption to a user by performing a correction according to an operation season of a factory.

In the energy evaluation support system, the program, and the information storage medium, the design request may include a count unit instruction indicating a count unit according to a scale of production steps and an output form instruction indicating an output form, the processing means may compute the amount of the first energy consumption by the count unit according to the count unit instruction, and the output means may output the amount of the first energy consumption in the output form according to the output form instruction.

In the energy evaluation support method, the design request may include a count unit instruction indicating a count unit according to a scale of production steps and an output form instruction indicating an output form, the amount of the first energy consumption may be computed by the count unit according to the count unit instruction, and the amount of the first energy consumption may be output in the output form according to the output form instruction.

With this configuration, the energy evaluation support system and the like can present an amount of energy consumption for each predetermined count unit such as production steps or the like to a user according to design request by the user in an output form desired by the user.

In the energy evaluation support system, the program, and the information storage medium, each of the first, second, and third energy consumption and the energy consumption per device may be electric power consumption, and the processing means may compute the total amount of the electric power consumption by adding an amount of electric power consumption in the production devices to be used and an amount of electric power consumption in the requisite-power supply devices to be used.

In the energy evaluation support method, each of the first, second, and third energy consumption and the energy consumption per device may be electric power consumption, and the total amount of the electric power consumption may be computed by adding an amount of electric power consumption in the production devices to be used and an amount of electric power consumption in the requisite-power supply devices to be used.

With this configuration, the energy evaluation support system and the like can more precisely present the total amount of electric power consumption to a user by computing it based on the coefficient of energy consumption.

BRIEF DESCRIPTION OF THE SEVERAL VIEWS OF THE DRAWING

FIG. 3 is a schematic view of an image used for inputting data relating to a production device according to an example of an embodiment of the present invention.

FIG. 4 is a schematic view of an image used for inputting data relating to a production process according to an example of an embodiment of the present invention.

FIG. 5 is a schematic view of an image used for inputting data relating to production steps according to an example of an embodiment of the present invention.

DETAILED DESCRIPTION OF THE EMBODIMENT

The description below relates to a case in which the present invention is applied to an energy evaluation support system for designing a semiconductor manufacturing factory, with reference to the accompanying figures. Note that the embodiments described below do not limit the scope of the invention defined by the claims laid out herein. Similarly, the overall configuration of the embodiments below should not be taken as limiting the subject matter defined by the claims herein.

Explanation of the Entire System

This embodiment of the present invention realizes an energy evaluation support system which can simulate energy consumption at a design stage of a factory by using a conversion factor which can be-used to convert various kinds of requisite powers into a single kind of energy amount (which is electric power consumption in this embodiment).

Thus, the energy evaluation support system can efficiently and precisely present the energy consumption to a user according to various requirements from the user.

The functional blocks of the energy evaluation support system for realizing such a function will now be described.

Figure 1:
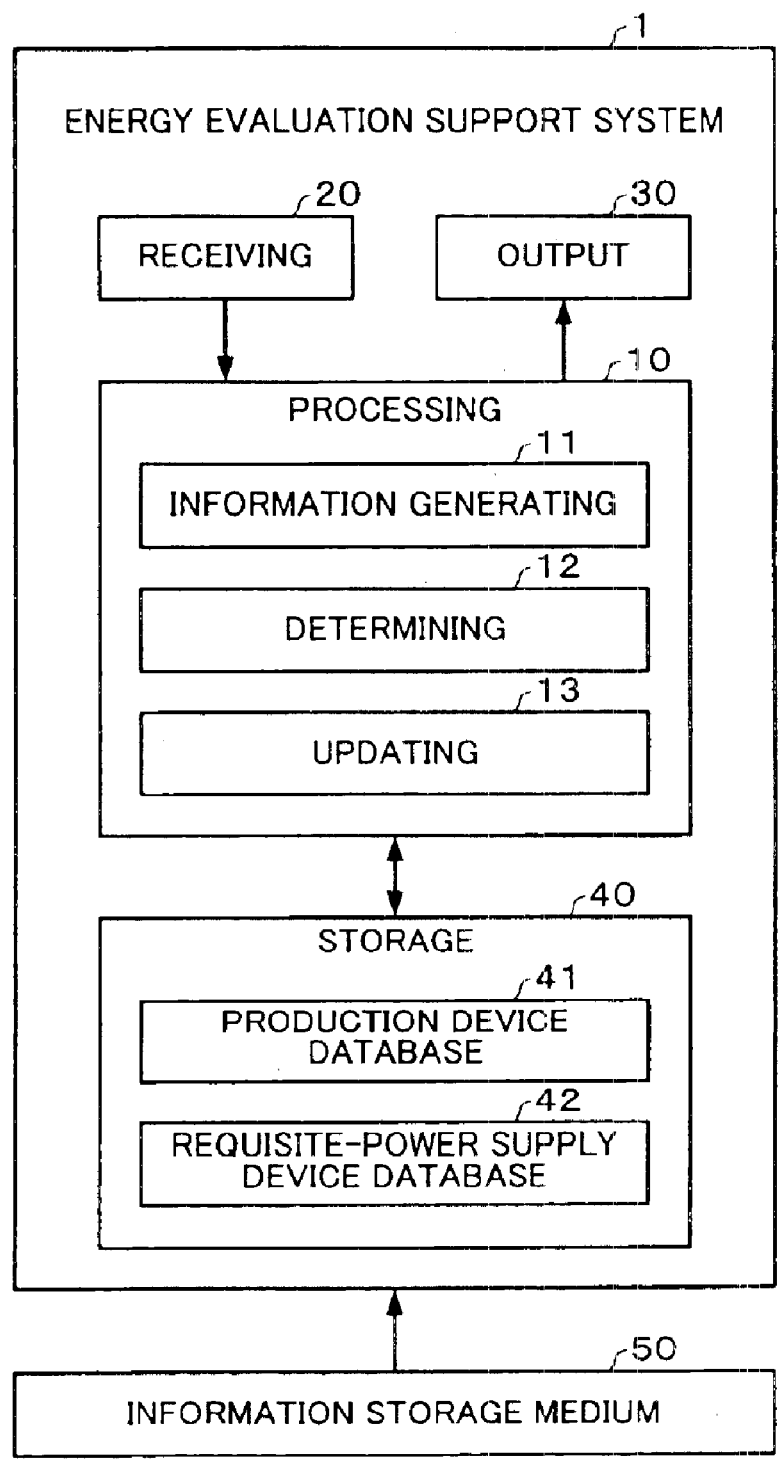
FIG. 1 is a functional block diagram of an energy evaluation support system according to an example of an embodiment of the present invention.

FIG. 1 is a functional block diagram of an energy evaluation support system according to an example of an embodiment of the present invention.

The energy evaluation support system 1 comprises a receiving section 20 into which a user is to enter input information for requirements of factory design and the like, a storage section 40 for storing various kinds of databases, a processing section 10 for computing the total electric power consumption according to a design request received through the receiving section 20, based on the databases, an output section 30 for presenting the total electric power consumption computed by the processing section 10 to the user in a predetermined form.

The processing section 10 comprises an information generating section 11 for generating image information and the like which are to be outputted from the output section 30, a determining section 12 for determining the contents and the like of the input information received through the receiving section 20, and an updating section 13 for updating the data in the storage section 40.

The storage section 40 has stored a production device database 41 of information relating to production devices, and a requisite-power supply device database 42 of information relating to requisite-power supply devices, each of which supplies requisite power to the corresponding production device.

The energy evaluation support system 1 of this embodiment is applied to a simulation for semiconductor factory. In this case, the production devices may correspond to devices directly concerning the production of semiconductor (more particularly, for example, wafer washing device). In this case, the requisite-power supply devices may correspond to cold source equipment (e.g., turbo-refrigerating machine and the like) or heat source equipment (e.g., heavy-oil-fired-once-through-boiler and the like).

The production device database 41 has stored production device identification cords, electric power consumption per minute, maintenance electric power consumption per minute and the like. The requisite-power supply device database 42 has stored requisite-power supply device identification codes, requisite power supply ability, electric power consumption per minute, maintenance electric power consumption per minute and the like.

The energy evaluation support system 1 may be implemented by one personal computer (PC). Alternatively, sections of the energy evaluation support system 1 may be distributed and implemented by a plurality of PCs. For example, when the energy evaluation support system 1 is implemented by a PC, for example, the processing section 10 may be implemented by a CPU or the like. The receiving section 20 may be implemented by a keyboard, a bar code reader, a voice-input device, a touch panel or the like. The output section 30 may be implemented by a video card, a liquid crystal display, a printer, a projector or the like. The storage section 40 may be implemented by a RAM, HDD or the like.

Furthermore, the functions of the processing section 10 and the like may be implemented by the computer by reading a program out of an information storage medium 50, which program is designed to cause the computer to function as the processing section 10 and the like.

As an information storage medium 50, a CD-ROM, DVD-ROM, ROM, RAM, HDD or the like may be employed, by way of examples, through either of the contact or non-contact type reading mode.

In place of the information storage medium 50, the aforementioned functions of the processing section 10 and the like may be implemented by the computer by downloading a program for implementing the above functions by the computer or the like from a host device or the like through a transmission channel.

Explanation of Flow of Processing

A flow of processing using the processing section 10 and the like will be described below.

Figure 2:
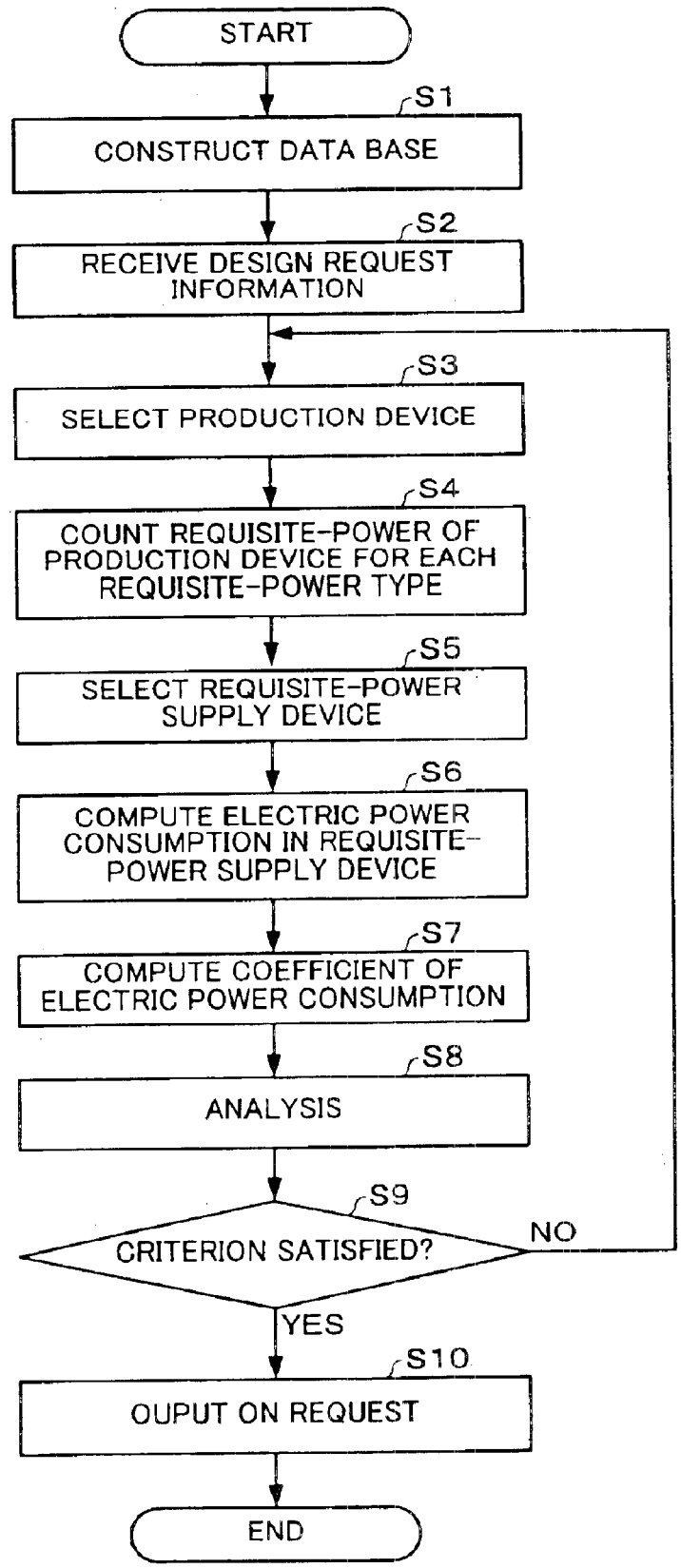
FIG. 2 is a flow chart illustrating a flow of simulation for electric power consumption according to an example of an embodiment of the present invention.

FIG. 2 is a flow chart illustrating a flow of simulation for electric power consumption according to an example of an embodiment of the present invention. Herein, the flow of simulation will be described in connection with electric power consumption when a factory designer designs a new factory including a plurality of production devices and a plurality of requisite-power supply devices.

The factory designer has previously constructed the production device database 41 and the requisite-power supply device database 42. Specifically, the factory designer has inputted data into the energy evaluation support system 1 based on designed and measured values for production devices and requisite-power supply devices.

A data inputting image displayed by the output section 30 will be described below.

FIG. 3 is a schematic view of an image used for inputting data relating to a production device according to an example of an embodiment of the present invention.

Various kinds of input items are provided in the data inputting image relating to the production devices. The input items may include, for example, Device Classification; Production Device Identification Information; Device Number; Production Device Version; Device Name; Device Maker; Operating Rate; Accessorial Device Name; Accessorial Device Version; Production Device Main Body Price [¥]; Accessories Price [¥]; Used Electric Power Consumption per Minute [kwh/minute]; Flow Rate of Cooling Water Used per Minute [l/minute]; Time Instructed Maintenance Item; Total Maintenance Time; Maintenance Frequency; Maintenance Cost; Recipe Name of Time Instructed Quality Inspection; Number of Quality Inspection Sheets; Quality Inspection Time [h]; Quality Inspection Cost [¥/time]; Quality Inspection Energy [kwh/time]; Time Instructed Quality Control Item; Quality Inspection Frequency [times/day] and others.

The accessorial device is a device attached to a production device. The accessorial device may correspond to a neutralizing device or the like.

The updating section 13 updates the production device database 41 based on the information inputted by the user in the data inputting image relating to production devices.

The updating section 13 also updates the requisite-power supply device database 42 based on the information inputted by the user in the data inputting image relating to requisite-power supply devices.

FIG. 4 is a schematic view of an image used for inputting data relating to a production process according to an example of an embodiment of the present invention.

Items relating to the production process may correspond to, for example, Block Name; Device ID; Device Number; Version; Recipe Name; Raw Process Time (RPT) [minute]; Part Interval Time (PIT) [minute]; Lot Size [sheets/lot]; Batch Size [lots/batch]; Electric Power Consumption of Production Device [kwh/minute]; Flow Rate of Cooling Water Used in Production Device [l/minute]; Electric Power Consumption of Accessorial Device [kwh/minute]; Flow Rate of Cooling Water used in Accessorial Device [l/minute]; Material Name; Amount of Materials Used [cc/sheets]; Number of Sheet Instructed Maintenance Item; Total Maintenance Time [h]; Maintenance Frequency [per sheet]; Maintenance Cost [Yen/time]; Number of Sheet Instructed Quality Inspection Recipe Name; Number of Sheets Verified in Quality [sheets]; Quality Inspection Time [h]; Quality Inspection Cost [Yen/time]; Energy Used in Quality Inspection [kwh/time], Number of Sheet Instructed Quality Control Item; Quality Control Frequency [per sheet], Used Recipe Name; Number of Used Sheets [sheets] and others.

"RPT" used herein is a period of time required to process one piece of wafer from the start of the process to the end thereof. "PIT" used herein is a time interval after one wafer is put in and before the next wafer is put in.

The updating section 13 can precisely compute the electric power consumption by having stored RPT, PIT, the lot size indicating the number of wafers per one lot and the batch size indicating the number of lots per one processing in the production device database 41, not only when a plurality of processings is linearly made, but also when a plurality of processings are made in parallel. In addition, the updating section 13 can easily re-compute the electric power consumption, even if a production condition such as RPT is changed.

FIG. 5 is a schematic view of an image used for inputting data relating to production steps according to an example of an embodiment of the present invention.

Items relating to the production steps may correspond to, for example, Product Type; Product Type Version; Order of Steps; Step Name; Device ID Used; Recipe Name Used (Name of Production Condition Used); Recipe Version Used and so on.

The updating section 13 has also stored information relating to these production steps in the production device database 41.

By the above-mentioned procedure, the updating section 13 stores various kinds of information relating to the production devices (e.g., types of requisite powers, amount of requisite power, productive capacities, production steps, production step order and the like, all of which are necessary for the production devices) in the production device database 41 and also stores various kinds of information relating to the requisite-power supply devices (e.g., types of requisite powers, amount of requisite powers, requisite power supply ability and the like, all of which are necessary for the requisite-power supply devices) in the requisite-power supply device database 42.

By having constructed the production device database 41 and requisite-power supply device database 42 in such a manner, the information generating section 11 can accumulate the data in various kinds of count units such as production devices, production steps and the like. Even if the order of production steps is changed or a production device or requisite-power supply device is replaced by another, the information generating section 11 can efficiently re-compute the energy consumption.

As described, the receiving section 20 receives the input information from the user and the updating section 13 uses the input information to update the production device database 41 and requisite-power supply device database 42 (step S1).

After the databases have been constructed, the designer makes a design request. The receiving section 20 then receives information of the design request (step S2). The design request includes at least one of an operation season instruction indicating the operation season of a factory, a count unit instruction indicating the count unit according to the scale of production steps, and an output form instruction indicating the output form, in addition to a production condition instruction indicating a production condition.

The production condition may correspond to an object to be produced, an amount of production or the like. The count unit may correspond to a device unit, a device type unit, a step unit, a requisite-power unit, a factory unit or the like. The output form may correspond to a graph form, a table form, an image output form, a voice output form, a print form or the like.

The determining section 12 determines the contents of the design request and selects a plurality of production devices to be applied, based on the production device database 41 (step S3).

The information generating section 11 then counts the requisite powers of the production devices selected by the determining section 12 for each of the requisite power types (step S4).

The determining section 12 then selects a requisite-power supply device satisfying a demand of requisite power according to the counted value, based on the requisite-power supply device database 42 (step S5).

The information generating section 11 then computes electric power consumption of the requisite-power supply device selected by the determining section 12 (step S6).

Figure 6:
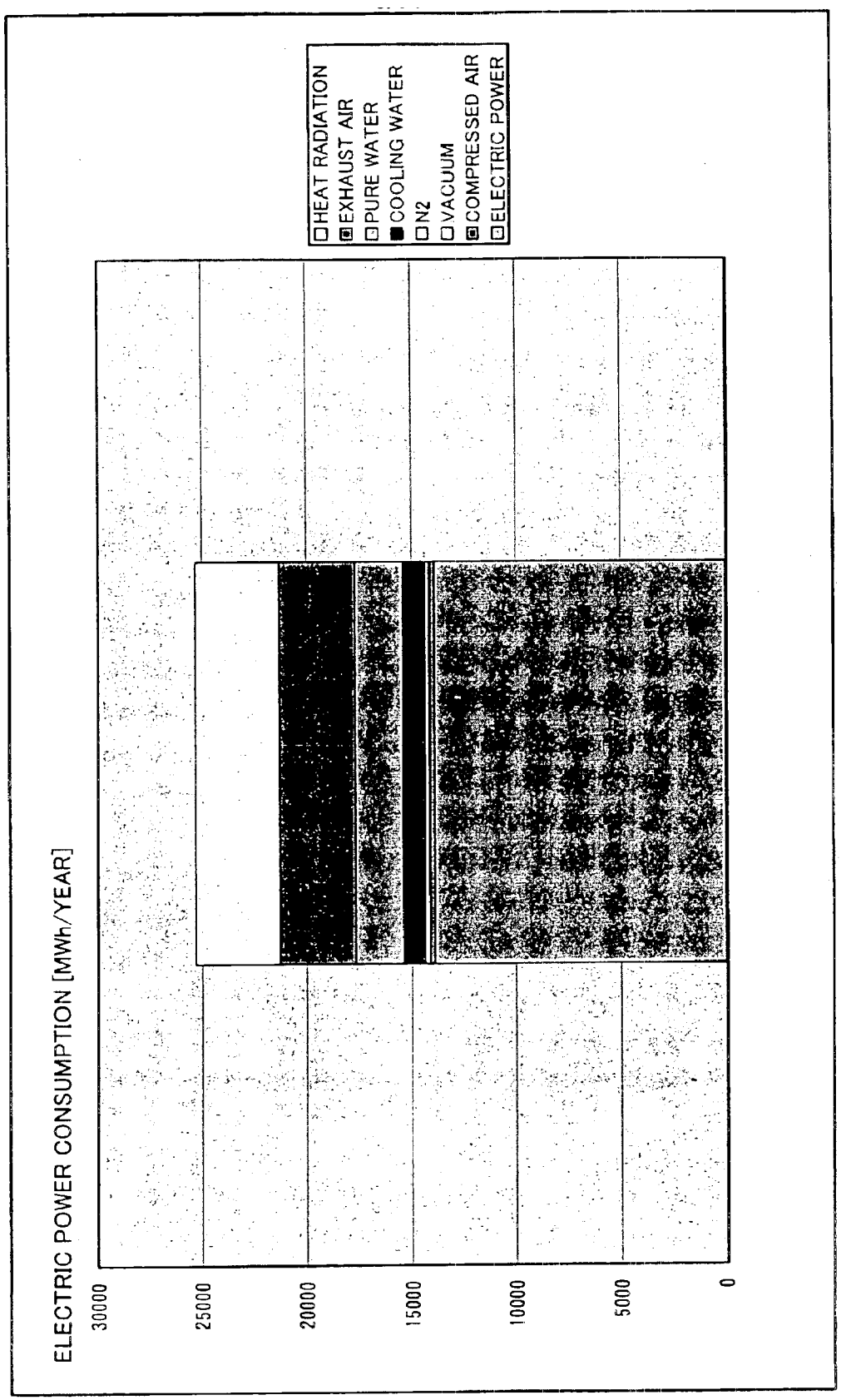
FIG. 6 is a graph schematically showing the total electric power consumption according to an example of an embodiment of the present invention.
Figure 9:
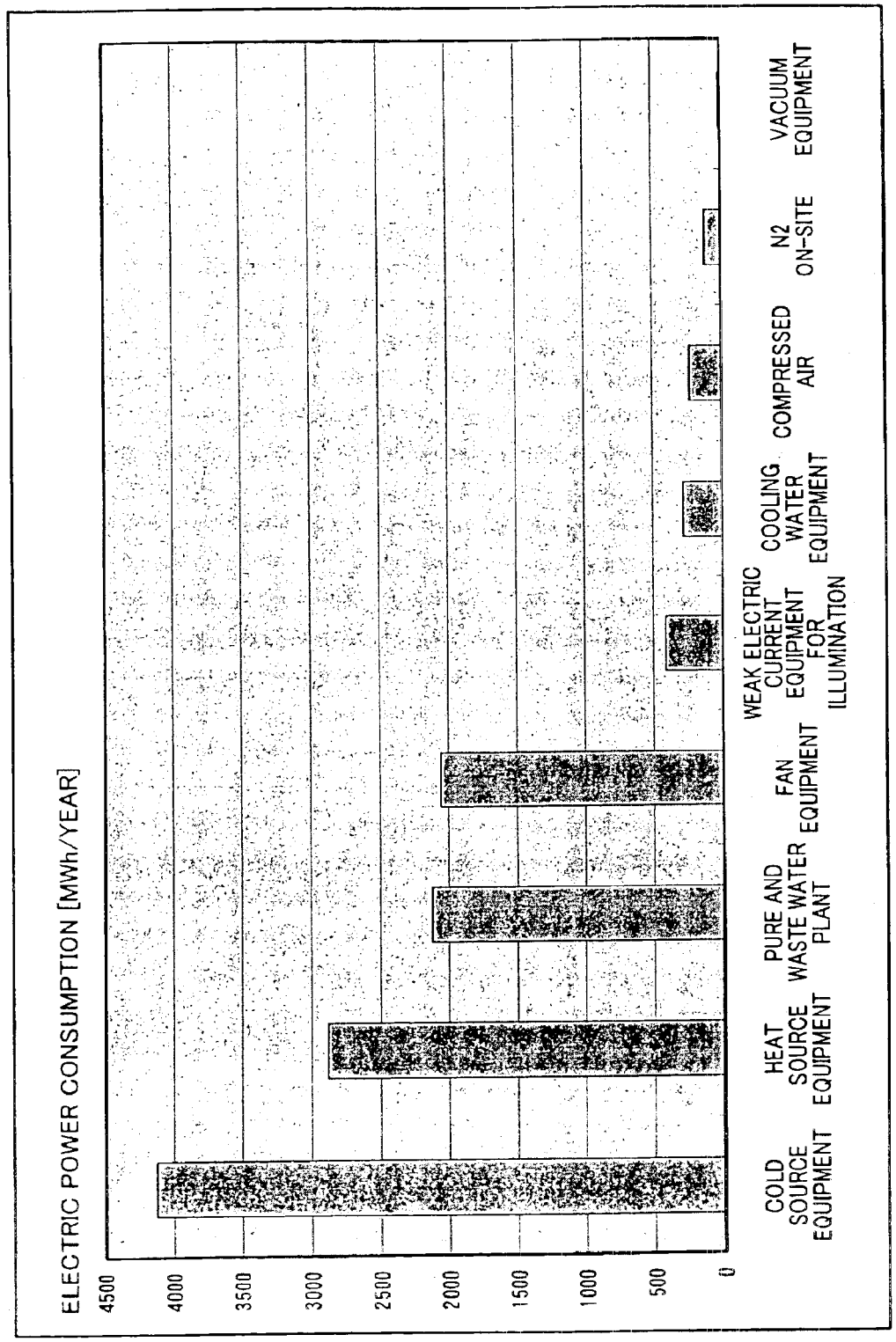
FIG. 9 is a graph schematically showing electric power consumption for each requisite-power supply device according to an example of an embodiment of the present invention.

As a result, the information generating section 11 can determine the electric power consumption for each of the requisite power types, as shown in FIG. 9. The information generating section 11 can also determine the total electric power consumption as shown in FIG. 6 by coupling these electric power consumption.

The information generating section 11 can computes a coefficient of electric power consumption which is a kind of energy consumption coefficient indicating third energy consumption per one requisite power supply unit in the requisite-power supply device, based on the second energy consumption of the respective requisite-power supply device for each of the requisite power types (step S7).

A concrete computation of electric power consumption coefficient will be described in connection with a case wherein an electric power consumption coefficient for exhaust is determined. For example, a semiconductor manufacturing factory may need, for example, cooling of production devices, cooling by taking in fresh-air for pressurizing a clean room, cooling by taking in fresh-air for replenishing air by the amount of discharged exhaust, cooling of pure and raw waters, cooling of a heated building through heat transfer, cooling of heat due to human bodies, cooling of heat due to illumination, cooling of heat due to a filter unit of a fan for maintaining clean environment and other cooling steps. If the sum of the amount of cooling is 3000000 kcal/h, a turbo-refrigerating machine which can deal with such a summed amount of cooling is selected, 800 kw of electricity is consumed by the turbo-refrigerating machine. If a sirocco fan which can deal with the counted amount of exhaust from all the production devices is selected, by way of example, its electric power consumption is 50 kw. Electric power consumption for the other requisite powers is similarly determined.

Load ratio is then decided for each of the requisite power types. For example, if the amount of cooling by taking in fresh-air for replenishing air by an amount of discharged exhaust occupies 8% of the summed amount of cooling, the electric power consumption required for exhaust in the cooling is 800 kw*24 hours*365 days*8%=560640 kwh/year. In fact, the electric power consumption required for cooling varies on temperature, but it is not considered here for simplicity.

In such a manner, all the electric power consumption for exhaust are counted. For example, it is assumed that electric power consumption relating to exhaust is electric power consumption for exhausting 438000 kwh/year+electric power consumption for cooling 560640 kwh/year+electric power consumption for heating 54000 kwh/year=1052640 kwh/year. It is also assumed that the total exhaust amount is 50000 m$^3$/hour=438000000 m$^3$/year.

In this case, a coefficient of electric power consumption is 1052640/438000000=0.002 kwh/m$^3$. The information generating section 11 can immediately determine the electric power consumption by multiplying this coefficient of electric power consumption by the necessary exhaust amount.

The determining section 12 then analyzes the electric power consumption (step S8) and determines whether or not the electric power consumption to be adjusted satisfies a predetermined criterion (e.g., the electric power consumption is less than a reference value) (step S9).

Figure 7:
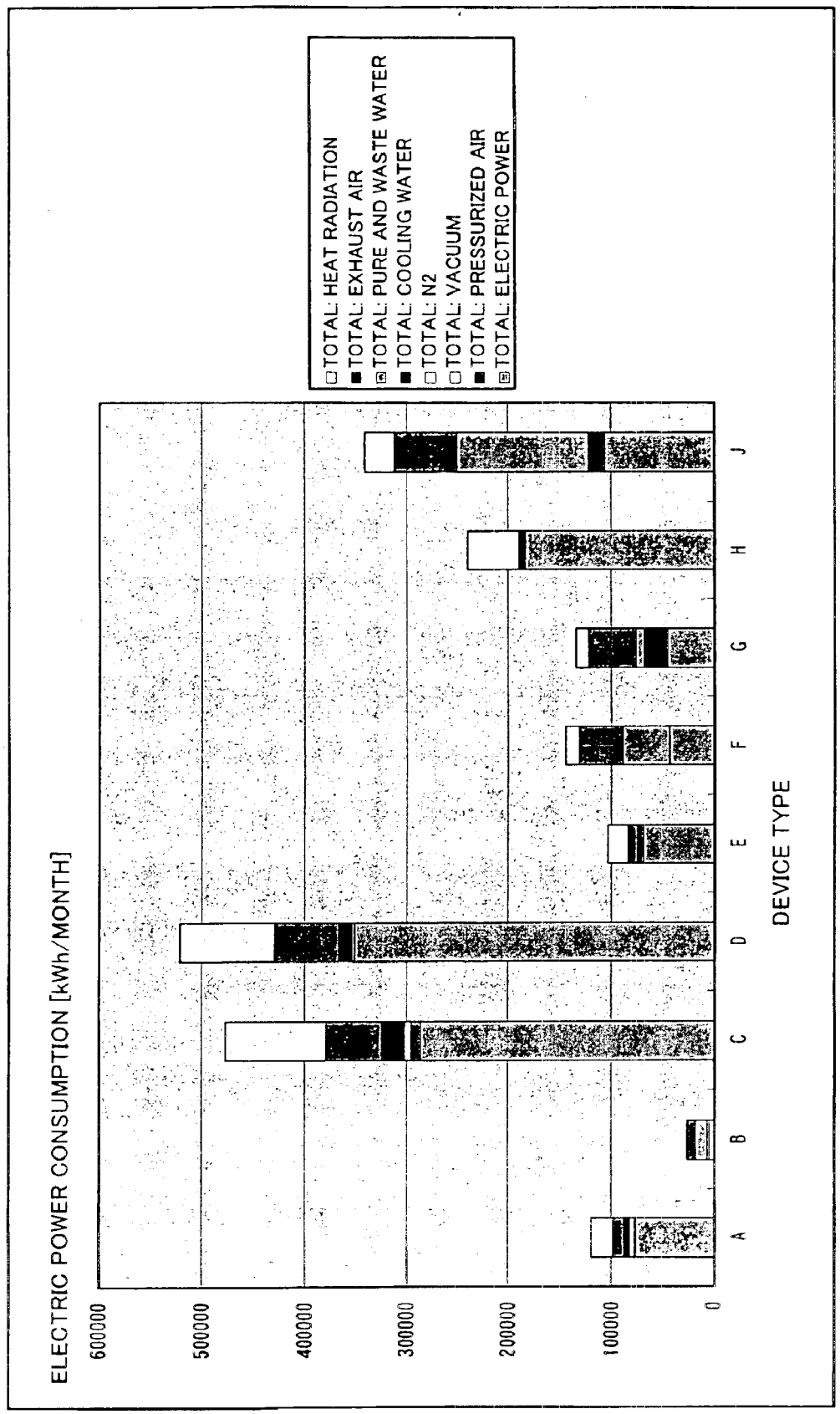
FIG. 7 is a graph schematically showing electric power consumption for each type of production devices according to an example of an embodiment of the present invention.
Figure 8:
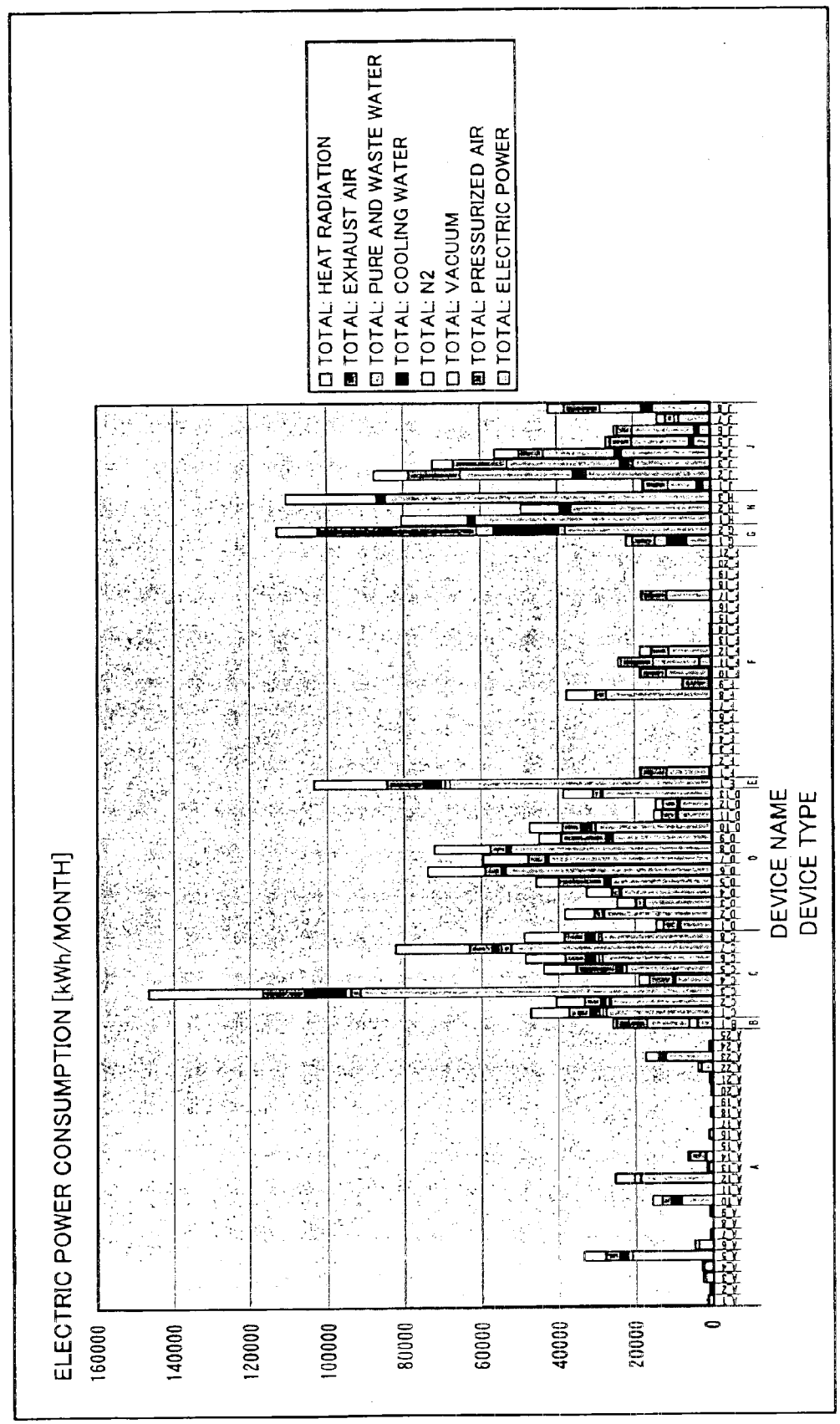
FIG. 8 is a graph schematically showing electric power consumption for each production device according to an example of an embodiment of the present invention.

FIG. 6 is a graph schematically showing the total electric power consumption according to an example of an embodiment of the present invention. FIG. 7 is a graph schematically showing electric power consumption for each type of production devices according to an example of an embodiment of the present invention. FIG. 8 is a graph schematically showing electric power consumption for each production device according to an example of an embodiment of the present invention. FIG. 9 is a graph schematically showing electric power consumption for each requisite-power supply device according to an example of an embodiment of the present invention.

For example, the electric power consumption for each requisite power type (e.g., heat radiation or exhaust) in each of the production devices is as shown in FIG. 8. When the count is made for each of the production device types, the electric power consumption is as shown in FIG. 7. The information generating section 11 can determine the necessary amount of requisite power by counting these counted values for each of the requisite power types.

Figure 10:
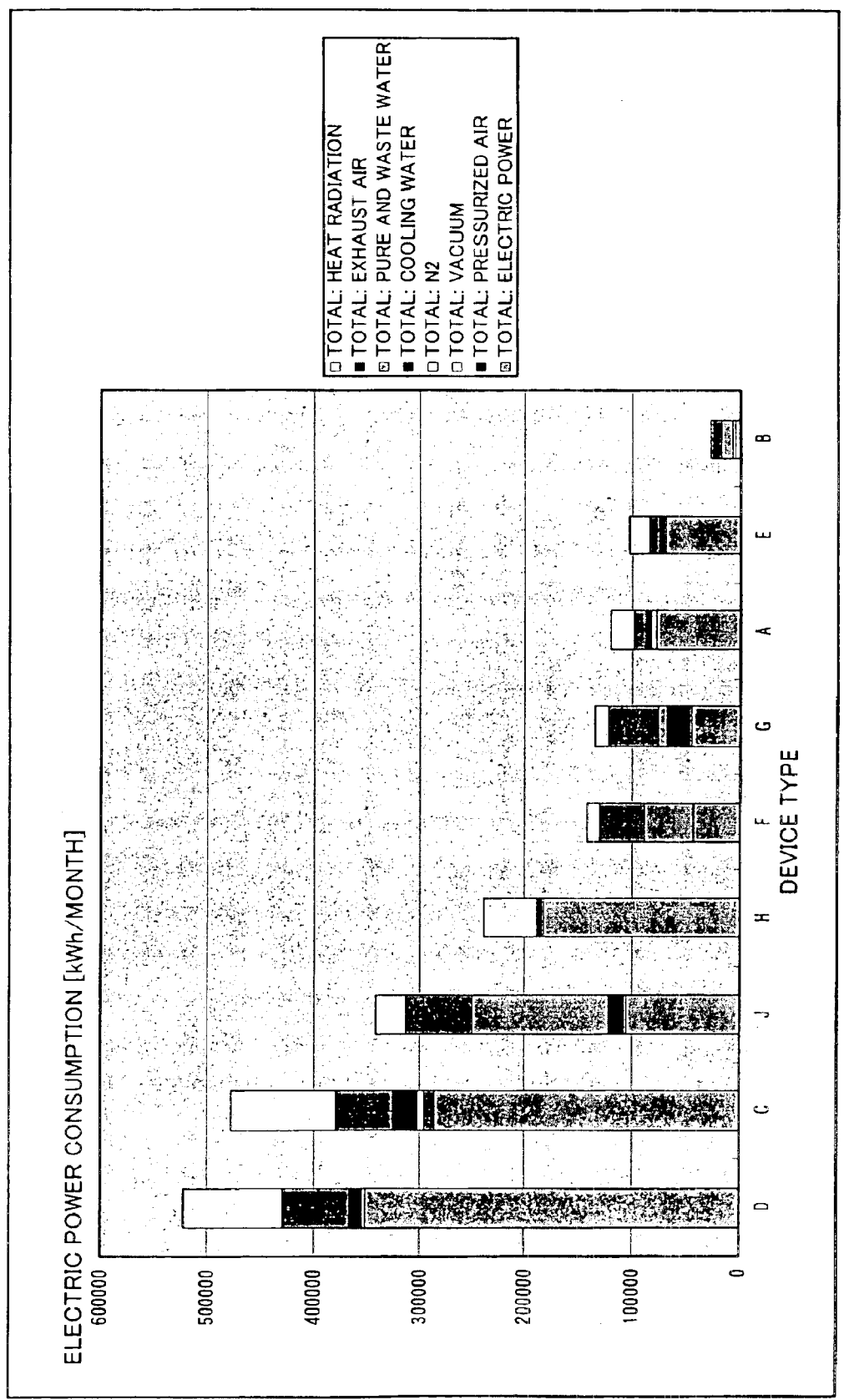
FIG. 10 is a graph schematically showing electric power consumption for each type of production device and requisite-power supply device in the order corresponding to electric power consumption according to an example of an embodiment of the present invention.

FIG. 10 is a graph schematically showing electric power consumption for each type of production device and requisite-power supply device in the order corresponding to electric power consumption according to an example of an embodiment of the present invention.

For example, if objects to be adjusted are cold source equipment, a pure/waste water plant and fan equipment and when a criterion is not satisfied if an annual electric power consumption of requisite-power supply device is equal to or more than 2000 MWh, the determining section 12 changes the cold source equipment, pure/waste water plant and fan equipment to other requisite-power supply devices since, in such an example as shown in FIG. 9, the cold source equipment, pure/waste water plant and fan equipment do not satisfy this criterion.

If the production devices are set to reduce the electric power consumption about the requisite powers which are dominant about upper three types of devices in total electric power consumption, the determining section 12 selects a device to reduce the electric power consumption about device types C and D, and selects a device to reduce pure water about device type J.

In such a manner, the determining section 12 changes devices to be applied. The updating section 13 causes the storage section 40 to store such settings as criterion determining data, based on input information about setting by a user. The determining section 12 determines whether or not the criterion can be satisfied, based on the criterion determining data.

Figure 11:
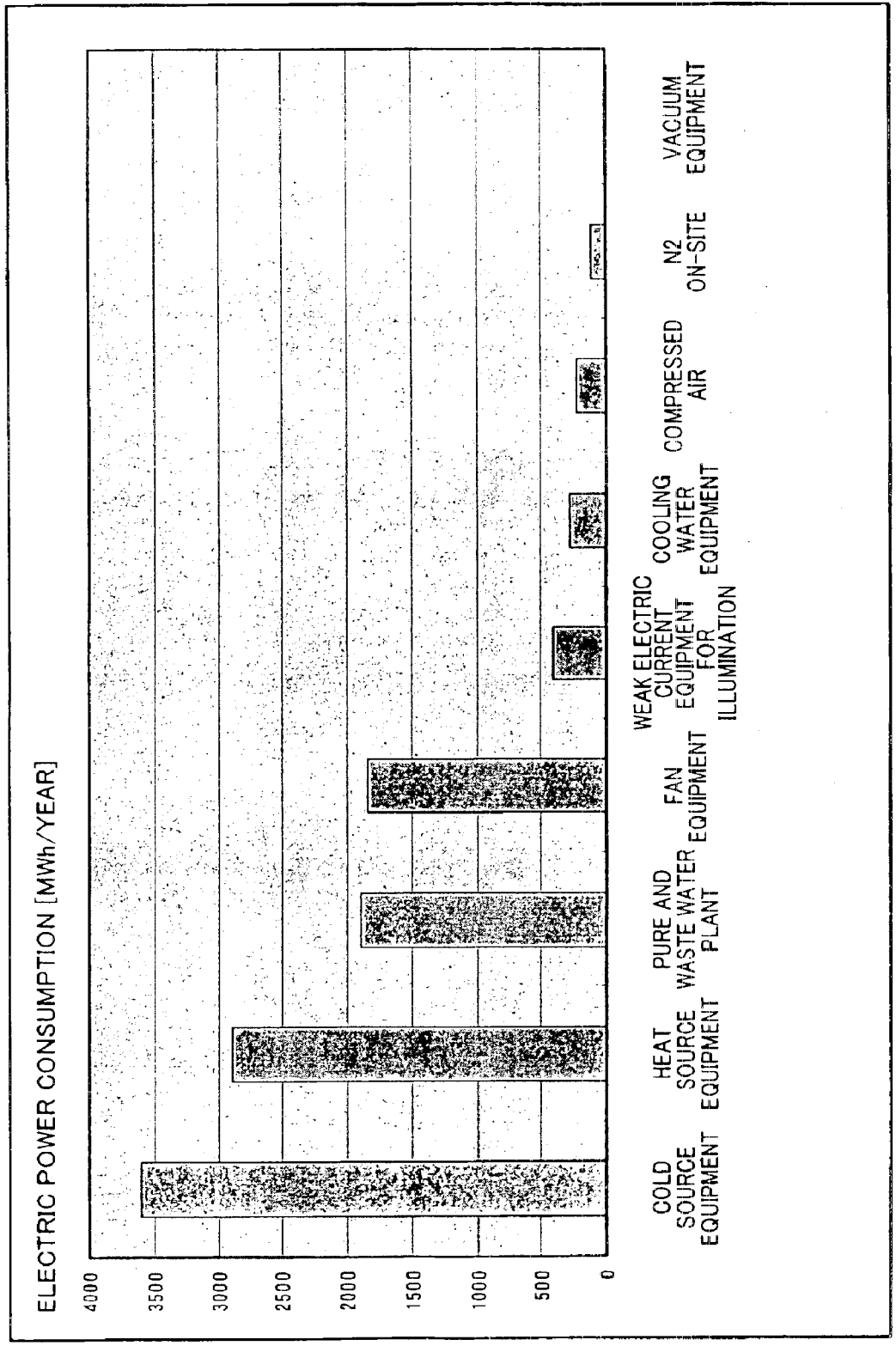
FIG. 11 is a graph schematically showing electric power consumption for each requisite-power supply device after a change in production devices and requisite-power supply devices to be used according to an example of an embodiment of the present invention.
Figure 12:
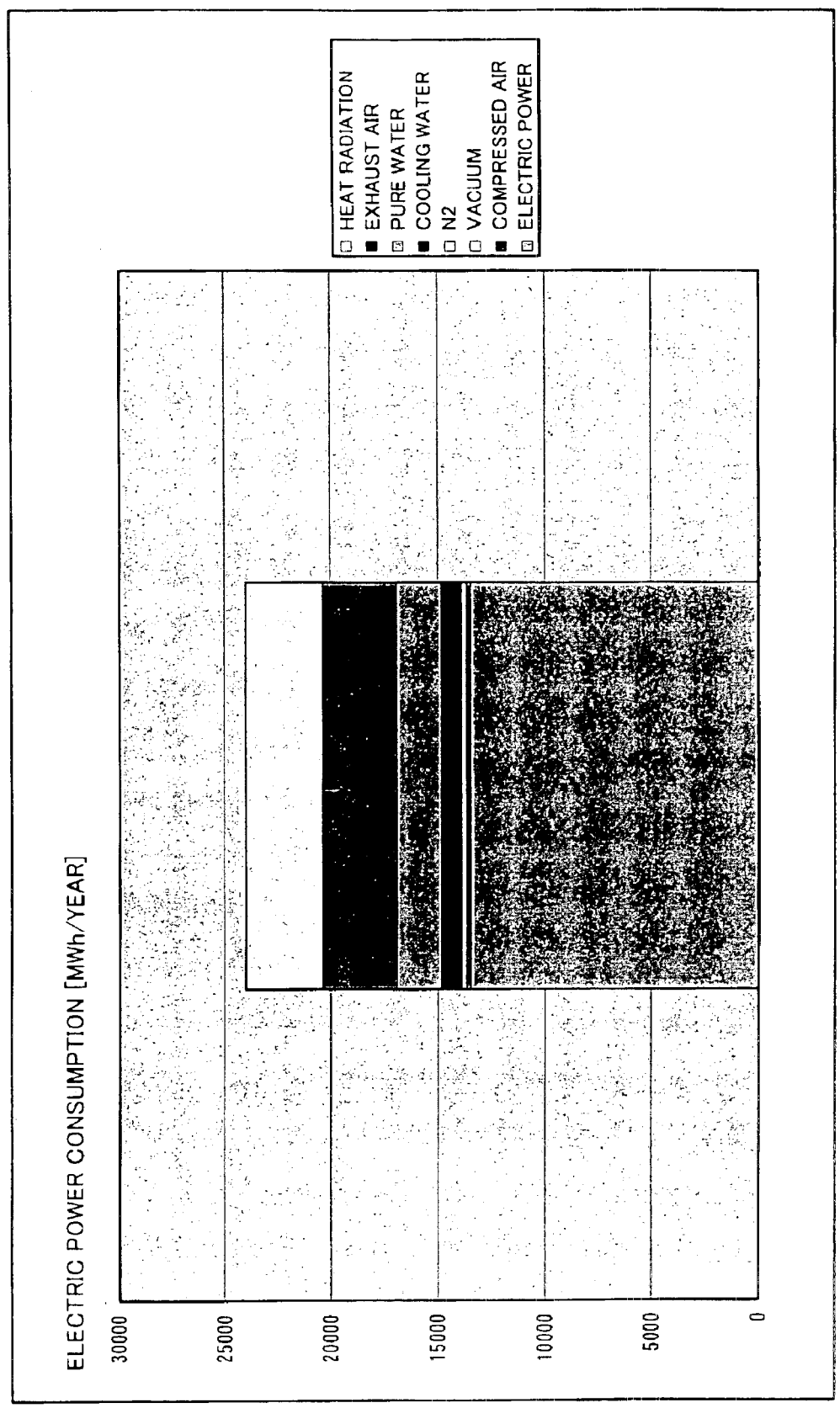
FIG. 12 is a graph schematically showing the total electric power consumption after a change in production devices and requisite-power supply devices to be used according to an example of an embodiment of the present invention.
Figure 13:
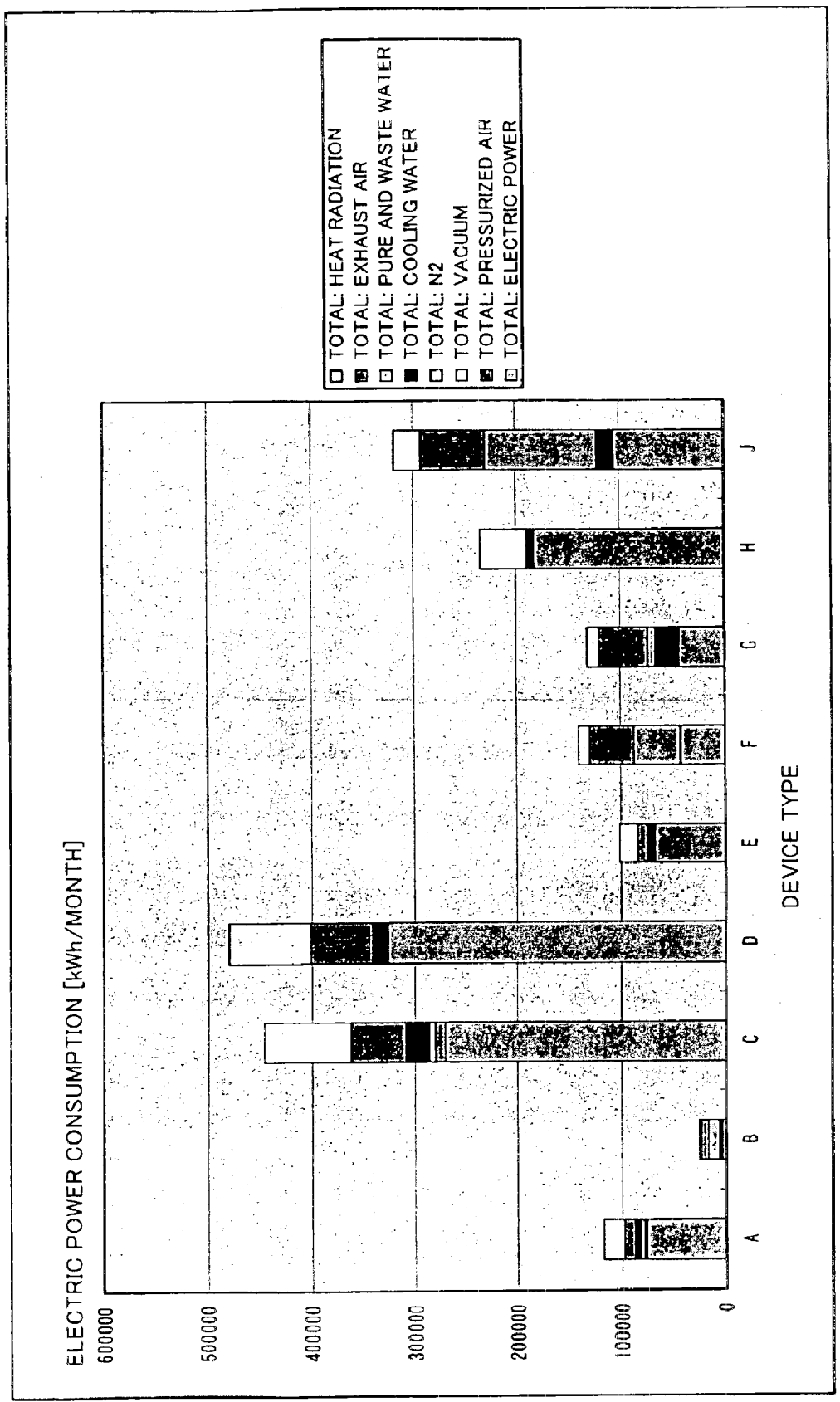
FIG. 13 is a graph schematically showing electric power consumption for each type of production devices after a change in production devices and requisite-power supply devices to be used according to an example of an embodiment of the present invention.
Figure 14:
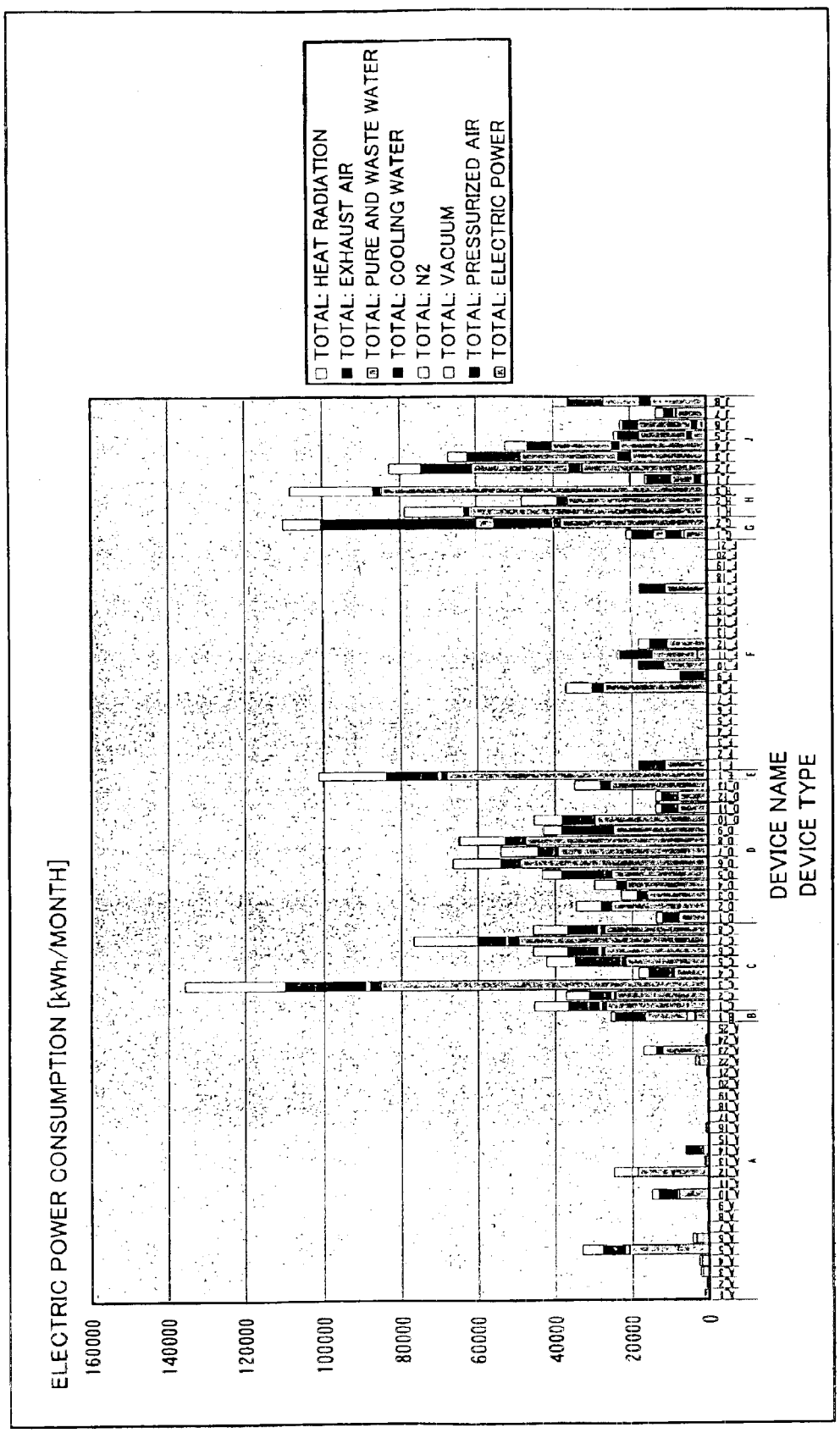
FIG. 14 is a graph schematically showing electric power consumption for each production device after a change in production devices and requisite-power supply devices to be used according to an example of an embodiment of the present invention.

FIG. 11 is a graph schematically showing electric power consumption for each requisite-power supply device after a change in production devices and requisite-power supply devices to be used according to an example of an embodiment of the present invention. FIG. 12 is a graph schematically showing the total electric power consumption after a change in production devices and requisite-power supply devices to be used according to an example of an embodiment of the present invention. FIG. 13 is a graph schematically showing electric power consumption for each type of production devices after a change in production devices and requisite-power supply devices to be used according to an example of an embodiment of the present invention. FIG. 14 is a graph schematically showing electric power consumption for each production device after a change in production devices and requisite-power supply devices to be used according to an example of an embodiment of the present invention.

As can be seen from the comparisons between FIGS. 9 and 11; FIGS. 6 and 12; FIGS. 7 and 13; and FIGS. 8 and 14, the determining section 12 has been able to reduce the total electric power consumption and the like by changing the devices to be applied.

In such a manner, if the predetermined criterion is not satisfied, the determining section 12 and the like repeatedly carry out the process from the selection of production device (step S3) to the judgment (step S9).

If the predetermined criterion has already been satisfied, the output section 30 displays an image indicating the electric power consumption in the output form according to the output form instruction by a count unit according to the scale of production steps specified by the count unit instruction (step S10).

As described, the energy evaluation support system 1 according to this embodiment can efficiently and precisely compute the energy consumption according to the changed amount of requisite power supply which is associated with the increase and decrease in the number of production devices by converting the energy consumption in the requisite-power supply device into the coefficient of energy consumption.

The energy evaluation support system 1 also determines whether or not the selected production and requisite-power supply devices include any device in which the energy consumption thereof is equal to or higher than the predetermined reference value. If so, that device is replaced by another device. Thus, the energy evaluation support system 1 can present a factory consisting of devices with less energy consumption to the user.

At the design stage, thus, the user can plan the saving of energy and optimize the factory design, production line design and production process design in a shorter period of time. Since even if the user changed the production condition or the like, the energy evaluation support system 1 can display an image indicating an analysis result as shown in FIG. 6 and the like in a shorter period of time, a user can perform a simulation of factory design in a shorter period of time.

Furthermore, the energy evaluation support system 1 can compute the energy consumption in count unit according to the count unit instruction and output the energy consumption in the output form according to the output form instruction. Therefore, the energy evaluation support system 1 can present the energy consumption for each of predetermined count units such as production steps to a user in the user's desired output form in accordance with the user's design request.

Modification

Although the preferred embodiment of the present invention has been described, the present invention is not limited to the aforementioned forms.

Although the embodiment of the present invention has been described with no consideration of change of temperature associated with the seasonal cycle for simplification, the information generating section 11 may correct and compute the energy consumption according to the operation season instruction indicating the operation season in the factory.

Thus, the energy evaluation support system 1 can more precisely compute the electric power consumption in consideration of the seasonal cycle and more precisely present the energy consumption to the user.

Although the embodiment of the present invention has been described as to the automated device selection of the determining section 12 if the criterion is not satisfied, the output section 30 may display an image showing analysis results as shown in FIGS. 6 to 14 and the like, and may cause the user to select a device.

The energy evaluation support system 1 may sort various kinds of items as keys and input and output the data in the form of file, in the aforementioned image.

Moreover, the energy evaluation support system 1 may compute the entire energy consumption in consideration of the energy consumption in the accessorial devices such as lighting equipment and the like, in addition to those of the production devices and requisite-power supply devices.

Although the embodiment of the present invention has been described as to the energy evaluation support system 1 which computes electric power consumption as energy, it may compute expenses or the like into which the energy such as amount of heating power and electric power consumption and the like are converted.

What is claimed is:

1. An energy evaluation support system for presenting an amount of energy consumed in a factory with a plurality of devices to a user, the devices including a plurality of production devices and a plurality of requisite-power supply devices which supplies a plurality of types of requisite power to the plurality of the production devices, the system comprising:

receiving means for receiving a design request of a factory including a production condition instruction indicating a production condition decided by the user;

storage means for storing a production device database containing data relating to the plurality of the production devices and a requisite-power supply device database containing data relating to the plurality of the requisite-power supply devices;

processing means for computing an amount of first energy consumption for each of the plurality of the production devices and the plurality of the requisite-power supply devices and for each type of the requisite power, based on the production device database and the requisite-power supply device database according to the design request; and output means for presenting the amount of the first energy consumption computed by the processing means to the user in a predetermined form, wherein the processing means:

selects production devices to be used among the plurality of the production devices according to the production condition instruction, and computes an amount of the requisite power required by the production devices to be used for each type of the requisite power;

selects requisite-power supply devices to be used among the plurality of the requisite-power supply devices, based on the amount of the requisite power for each type of the requisite power, and computes an amount of second energy consumption required by the requisite-power supply devices to be used for each type of the requisite power; and computes a coefficient of energy consumption indicating an amount of third energy consumption per predetermined unit of the requisite power supplied by the requisite-power supply devices to be used, based on the amount of the second energy consumption for each type of the requisite power, and computes the amount of the first energy consumption based on the coefficient of energy consumption.

2. The energy evaluation support system as defined in claim 1, wherein the processing means determines whether or not any one of the production devices to be used and the requisite-power supply devices to be used has an amount of energy consumption per device equal to or greater than a predetermined reference value, and selects at least one of the plurality of the production devices and the plurality of the requisite-power supply devices having an amount of the energy consumption per device less than the predetermined reference value, in a case where any one of the production devices to be used and the requisite-power supply devices to be used has an amount of the energy consumption per device equal to or greater than the predetermined reference value.

3. The energy evaluation support system as defined in claim 1, wherein the design request includes an operation season instruction indicating an operation season of the factory, and wherein the processing means corrects the amount of the first energy consumption according to the operation season instruction.

4. The energy evaluation support system as defined in claim 1, wherein the design request includes a count unit instruction indicating a count unit according to a scale of production steps and an output form instruction indicating an output form, wherein the processing means computes the amount of the first energy consumption by the count unit according to the count unit instruction, and wherein the output means outputs the amount of the first energy consumption in the output form according to the output form instruction.

5. The energy evaluation support system as defined in claim 1, wherein each of the first, second, and third energy consumption and the energy consumption per device is electric power consumption, and wherein the processing means computes the total amount of the electric power consumption by adding an amount of electric power consumption in the production devices to be used and an amount of electric power consumption in the requisite-power supply devices to be used.

6. An energy evaluation support system for presenting an amount of energy consumed in a factory with a plurality of devices to a user, the devices including a plurality of production devices and a plurality of requisite-power supply devices which supplies a plurality of types of requisite power to the plurality of the production devices, the system comprising:

a receiving section which receives a design request of a factory including a production condition instruction indicating a production condition decided by the user;

a storage section which stores a production device database containing data relating to the plurality of the production devices and a requisite-power supply device database containing data relating to the plurality of the requisite-power supply devices;

a processing section which computes an amount of first energy consumption for each of the plurality of the production devices and the plurality of the requisite-power supply devices and for each type of the requisite power, based on the production device database and the requisite-power supply device database according to the design request; and an output section which presents the amount of the first energy consumption computed by the processing section to the user in a predetermined form, wherein the processing section:

selects production devices to be used among the plurality of the production devices according to the production condition instruction, and computes an amount of the requisite power required by the production devices to be used for each type of the requisite power;

selects requisite-power supply devices to be used among the plurality of the requisite-power supply devices, based on the amount of the requisite power for each type of the requisite power, and computes an amount of second energy consumption required by the requisite-power supply devices to be used for each type of the requisite power; and computes a coefficient of energy consumption indicating an amount of third energy consumption per predetermined unit of the requisite power supplied by the requisite-power supply devices to be used, based on the amount of the second energy consumption for each type of the requisite power, and computes the amount of the first energy consumption based on the coefficient of energy consumption.

7. A computer-readable program for causing a computer to function as an energy evaluation support system for presenting an amount of energy consumed in a factory with a plurality of devices to a user, the devices including a plurality of production devices and a plurality of requisite-power supply devices which supplies a plurality of types of requisite power to the plurality of the production devices, the program causing the computer to function as:

receiving means for receiving a design request of a factory including a production condition instruction indicating a production condition decided by the user;

storage means for storing a production device database containing data relating to the plurality of the production devices and a requisite-power supply device database containing data relating to the plurality of the requisite-power supply devices;

processing means for computing an amount of first energy consumption for each of the plurality of the production devices and the plurality of the requisite-power supply devices and for each type of the requisite power, based on the production device database and the requisite-power supply device database according to the design request; and output means for presenting the amount of the first energy consumption computed by the processing means to the user in a predetermined form, wherein the processing means:

selects production devices to be used among the plurality of the production devices according to the production condition instruction, and computes an amount of the requisite power required by the production devices to be used for each type of the requisite power;

selects requisite-power supply devices to be used among the plurality of the requisite-power supply devices, based on the amount of the requisite power for each type of the requisite power, and computes an amount of second energy consumption required by the requisite-power supply devices to be used for each type of the requisite power; and computes a coefficient of energy consumption indicating an amount of third energy consumption per predetermined unit of the requisite power supplied by the requisite-power supply devices to be used, based on the amount of the second energy consumption for each type of the requisite power, and computes the amount of the first energy consumption based on the coefficient of energy consumption.

8. An information storage medium storing a computer-readable program for causing a computer to function as an energy evaluation support system for presenting an amount of energy consumed in a factory with a plurality of devices to a user, the devices including a plurality of production devices and a plurality of requisite-power supply devices which supplies a plurality of types of requisite power to the plurality of the production devices, the program causing the computer to function as:

receiving means for receiving a design request of a factory including a production condition instruction indicating a production condition decided by the user;

storage means for storing a production device database containing data relating to the plurality of the production devices and a requisite-power supply device database containing data relating to the plurality of the requisite-power supply devices;

processing means for computing an amount of first energy consumption for each of the plurality of the production devices and the plurality of the requisite-power supply devices and for each type of the requisite power, based on the production device database and the requisite-power supply device database according to the design request; and output means for presenting the amount of the first energy consumption computed by the processing means to the user in a predetermined form, wherein the processing means:

selects production devices to be used among the plurality of the production devices according to the production condition instruction, and computes an amount of the requisite power required by the production devices to be used for each type of the requisite power;

selects requisite-power supply devices to be used among the plurality of the requisite-power supply devices, based on the amount of the requisite power for each type of the requisite power, and computes an amount of second energy consumption required by the requisite-power supply devices to be used for each type of the requisite power; and computes a coefficient of energy consumption indicating an amount of third energy consumption per predetermined unit of the requisite power supplied by the requisite-power supply devices to be used, based on the amount of the second energy consumption for each type of the requisite power, and computes the amount of the first energy consumption based on the coefficient of energy consumption.

9. An energy evaluation support method for presenting an amount of energy consumed in a factory with a plurality of devices to a user, the devices including a plurality of production devices and a plurality of requisite-power supply devices which supplies a plurality of types of requisite power to the plurality of the production devices, the method comprising:

storing a production device database containing data relating to the plurality of the production devices and a requisite-power supply device database containing data relating to the plurality of the requisite-power supply devices;

receiving a design request including a production condition instruction indicating a production condition decided by the user;

selecting production devices to be used among the plurality of the production devices according to the production condition instruction, based on the production device database;

computing an amount of the requisite power required by the production devices to be used for each type of the requisite power;

selecting requisite-power supply devices to be used among the plurality of the requisite-power supply devices, based on the requisite-power supply device database and the amount of the requisite power for each type of the requisite power;

computing an amount of second energy consumption required by the requisite-power supply devices to be used for each type of the requisite power;

computing a coefficient of energy consumption indicating an amount of third energy consumption per predetermined unit of the requisite power supplied by the requisite-power supply devices to be used, based on the amount of the second energy consumption for each type of the requisite power;

computing an amount of first energy consumption based on the coefficient of energy consumption; and outputting the amount of the first energy consumption in a predetermined form.

* * * * *